United States Patent

Thompson

[15] 3,697,570
[45] Oct. 10, 1972

[54] METHOD OF PREPARING ORGANIC ISOCYANATES IN THE PRESENCE OF MOLECULAR SIEVES

[72] Inventor: Edward J. Thompson, Watertown, Conn.

[73] Assignee: The Upjohn Company, Kalamazoo, Mich.

[22] Filed: July 30, 1969

[21] Appl. No.: 846,241

[52] U.S. Cl. ........... 260/453 PH, 252/455 Z, 252/463
[51] Int. Cl. ............................................. C07c 119/04
[58] Field of Search ....... 260/453 P, 453 PH, 453 PZ; 252/455 Z

[56] References Cited

UNITED STATES PATENTS

| | | | |
|---|---|---|---|
| 2,950,319 | 8/1960 | Schenck et al. | 260/582 |
| 2,999,861 | 9/1961 | Fleck et al. | 260/582 X |
| 2,680,129 | 6/1964 | Flores | 260/453 |
| 3,211,631 | 10/1965 | Fuchs | 260/453 X |
| 3,330,849 | 7/1967 | Ulrich | 260/453 |
| 3,449,395 | 6/1969 | Majewski et al | 260/453 |
| 2,882,244 | 4/1959 | Milton | 252/455 |
| 3,412,134 | 11/1968 | Jones | 252/455 X |
| 2,885,420 | 5/1959 | Spiegler | 260/453 |
| 2,950,307 | 8/1960 | France et al | 260/453 |

*Primary Examiner*—Floyd D. Higel
*Attorney*—Eugene O. Retter and Denis A. Firth

[57] ABSTRACT

An improved process is disclosed for the phosgenation of aliphatic and aromatic amines to obtain the corresponding organic isocyanates. The improvement comprises carrying out the known phosgenation procedure in the presence of crystalline zeolitic molecular sieves. The organic isocyanate products of the improved process show lighter coloration and improved color stability in comparison to isocyanates obtained by the prior known phosgenation processes.

4 Claims, No Drawings

METHOD OF PREPARING ORGANIC ISOCYANATES IN THE PRESENCE OF MOLECULAR SIEVES

BACKGROUND OF THE INVENTION

1. Field of the Invention

This invention relates to an improved process for the preparation of aliphatic and aromatic isocyanates by phosgenation of the corresponding amines and is more particularly concerned with a process for preparing organic isocyanates of improved color and for color-stabilizing of organic isocyanates by carrying out the preparation of the isocyanate in the presence of molecular sieves.

2. Description of the Prior Art

Aliphatic and aromatic isocyanates including both mono and polyfunctional types, hereinafter termed "isocyanates," are prepared in a variety of ways. The most widely used commercial methods are by phosgenation of the corresponding amine, using techniques which are for the most part well-known. The isocyanates are desirable compounds for use in the preparation of polymer surface coatings and the like, but selection of particular isocyanates to be so employed is limited to those which are themselves colorless, and therefore less apt to impart undesired color initially to the polymers when formed. The limitation is a severe one, since isocyanates particularly desirable on an economic basis tend to be colored, and a large number of isocyanates otherwise suitable for preparing polymer coatings, tend to discolor upon storage. This discoloration, i.e.: a change to yellow or brown may proceed rapidly, even though air, moisture, and light are excluded from contact with the isocyanates. Since the precise causes of color formation and discoloration are unknown, attempts to obtain colorless isocyanates have been mainly concerned with prevention of discoloration in those isocyanates which are colorless when made. One approach requires the addition of stabilizers as for example organic sulfonyl isocyanate [U.S. Pat. No. 3,330,849 (Ulrich)]. Generally, the use of additives is not entirely satisfactory, since some additives interfere with, or adversely affect, particular uses of the isocyanate. The use of active charcoal or activated earth filters, standard fluid decolorizing methods, has been considered but is not entirely satisfactory or efficient, yielding variable results while adding considerable cost to the product. The ideal then, is a standard commercial process, modified in a minor way, to yield colorless isocyanates which are otherwise normally colored, and to have these colorless isocyanates remain color stable under normal storage conditions for extended periods of time. Surprisingly, I have found this can be achieved by the process to be described hereinafter.

SUMMARY OF THE INVENTION

This invention is an improvement in the method for producing an organic isocyanate which is normally colored, by the reaction of phosgene with a member selected from the group consisting of the corresponding amine and salt thereof. The improvement comprises carrying out the reaction in the presence of a molecular sieve. The isocyanates produced by this improved process are lighter in color then those isocyanates prepared without including molecular sieves in the reaction. The invention is also concerned with the products obtained by use of the improved process.

DETAILED DESCRIPTION OF THE INVENTION

The conversion of primary amines and amine salts to corresponding aliphatic and aromatic isocyanates by phosgenation is amply described in the literature and many variations of reaction conditions with attendant variations of product are well-known (Polyurethanes: Chemistry and Technology, Part I, Saunders and Frisch, published by Interscience Pub., N.Y., 1962, pp. 18–24). Thus, depending upon the amine starting materials and reaction conditions, there are produced aliphatic and aromatic isocyanates which are mono, di and polyisocyanates and mixtures thereof. Illustrative of typical amines employed are methylene bis(4,4'-cyclohexyl amine), 1,6-hexamethylene diamine, 2,4'-diaminotoluene, aniline, 2,6-tolylene diamine, 2,4,6-tolylene triamine, toluidine, benzidine, naphthylamine, hexylamine, octylamine, dodecylamine, octadecylamine, tetramethylenediamine, octamethylene diamine, cyclohexylamine, phenylethylamine, phenylhexylamine, naphthyldodecylamine, methylene bis(4-phenylamine), 1,5-naphthylene diamine, chloroaniline, chlorohexylamine and the like and mixtures thereof. Amine salts employed are preferably the hydrochlorides and hydrobromides corresponding to the amines. Many of the crude aliphatic isocyanates, produced by these methods are colored, ranging in color from light yellow to dark brown.

Illustrative of colored isocyanates which may be prepared colorless or of lighter coloration, and of those isocyanates which have better color stability when prepared by the process of this invention are aryl isocyanates of six to seven carbon atoms, inclusive, such as phenylisocyanate, and tolyl isocyanate; chlorophenyl isocyanate, arylene diisocyanate of six to 12 carbon atoms, inclusive, such as meta or para phenylene diisocyanates, m-xylylene diisocyanate, p-xylylene diisocyanate, naphthalene-1,5-diisocyanate, diphenyl-4,4'-diisocyanate, and tolylene diisocyanate, including mixtures of the 2,4- and 2,6-isomers thereof; diphenylmethane-4,4'-diisocyanate and mixtures thereof containing polyisocyanates of higher functionality, 3-methyldiphenylmethane-4,4'-diisocyanate, chlorophenylene-2,4-diisocyanate, alkylene diisocyanates of four to 12 carbon atoms, inclusive, such as tetramethylene diisocyanate, pentamethylene diisocyanate, hexamethylene diisocyanate, heptamethylene diisocyanate, octamethylene diisocyanate, nonamethylene diisocyanate, decamethylene diisocyanate, dodecamethylene diisocyanate; cyclohexane-1,4-diisocyanate, cyclohexane-1,3-diisocyanate, methylcyclohexane-2,4- and 2,6-diisocyanates, 1,3- and 1,4-bis(isocyanatomethyl) cyclohexane, diisocyanatodicyclohexylmethane, β-isocyanatoethylphenyl isocyanate, α-isocyanatobenzyl isocyanate, alkyl isocyanates of one to 12 carbon atoms, inclusive, such as methyl isocyanate, ethyl isocyanate, propyl isocyanate, isopropyl isocyanate, butyl isocyanate, amyl isocyanate, hexyl isocyanate, heptyl isocyanate, octyl isocyanate, nonyl isocyanate, decyl isocyanate, dodecyl isocyanate; cyclohexyl isocyanate and chlorohexyl isocyanate, and the like.

The novel feature of this invention is inclusion of molecular sieves in the reaction mixture during phosgenation of the amine or amine salt. Preferably, the molecular sieves employed are first vacuum dried. The minimum ratio of molecular sieves to reaction mixture is about 1:100 to about 50:100 by weight. The preferred ratio is one favoring an excess of molecular sieves for increased surface contact with the reactants.

The molecular sieves employed in this invention are a class of materials well-recognized in the art and are defined as crystalline zeolites, both natural and synthetic. The natural crystalline zeolites are sodium and calcium aluminosilicates such as anocite, chabazite, heulandite, notrolite, stilbite and thomsonite. (Encyclopedia Of Chem. Technology, Vol. 12, pg. 295, 1954, Interscience Pub., Inc., N.Y., N.Y.). The synthetic crystalline zeolites are readily available commercially in the form of hydrated silicates of aluminum and an alkali metal such as sodium, calcium, potassium or combinations thereof. The synthetic crystalline zeolites have varying absorption characteristics which have been classified according to pore size and structure types. Types 3A, 4A, 5A, 10X and 13X illustrate types suitable for use in this invention. Type 3A has the smallest pore opening and will admit molecules having a diameter smaller than about 3 angstroms. Type 13X has the largest pore opening and will admit molecules having a diameter of not more than 9 angstroms. Type 4A is the preferred size, having less adverse effect on product yields, and has a pore opening which will admit molecules having a diameter smaller than about 4 angstroms (Linde Company Bulletin, F-9947D dated Jan. 15, 1963). The techniques for preparation of these synthetic crystalline zeolite molecular sieves are well-known, and descriptions of such preparations may be found for example in U.S. Pats. Nos. 2,882,243; 2,882,242 and 3,037,843; British Pats. Nos. 898,457; 986,864; 1,031,278; Netherlands Pat. No. 6,504,679; French Pat. No. 1,404,467; Belgian Pat. No. 635,617 and U.S.S.R. Pat. No. 170,912.

In general, the method of preparation of the above crystalline zeolite molecular sieves comprises mixing varying proportions of sodium aluminate with silicon dioxide. Both A and X types are prepared in this manner. By ion exchange, using techniques well-known in the art, the various calcium and potassium compounds are prepared from the sodium compound, thereby making the various pore size structures or types; for example type 5A is produced from type 4A by exchanging 75% of the sodium ions of type 4A with calcium ions and type 10X is similarly obtained from type 13X by ion exchange of calcium ions for sodium ions.

In carrying out the process of the invention the phosgenation of the amine is accomplished using well-known conventional methods; see, for example, the procedures described by Siefken, Annalen, 562, 75 et. seq, 1949. Illustratively, phosgene, either in a gaseous form or in the form of a solution in an inert solvent such as toluene, xylene, o-dichlorobenzene, p-dichlorobenzene, tetrahydronaphthalene, benzene, cyclohexane, diphenyl and, preferably, monochlorobenzene is brought into contact with the amine previously dissolved in one of the above mentioned solvents. Appropriate mixing procedures are utilized to obtain the best contact between amine and phosgene. Although the reaction will proceed at room temperature, it generally is accomplished by first mixing at a low or moderate temperature, and then treating the slurry with more phosgene at a higher temperature of from 80° to 200° C. The length of time required to complete the reaction is dependent on the reaction temperature and the particular amine to be phosgenated. Generally, the end point of the reaction is indicated by cessation of the evolution of hydrogen chloride gas, a reaction by-product. Following completion of the reaction, the solvent is stripped together with excess phosgene and residual hydrogen chloride, using conventional techniques such as evaporation, separation and distillation. When molecular sieves are used during phosgenation in accord with this invention, they are easily separated from the reaction mixture following completion of the reaction, by decantation and/or filtration.

The following examples describe the manner and process of making and using the invention and set forth the best mode contemplated by the inventor of carrying out the invention, but are not to be construed as limiting. All parts are by weight unless otherwise stated.

EXAMPLE 1

To a 1 liter vessel fitted with a water cooled condenser is added 100 gms vacuum dried 4A type molecular sieves (Linde Company, see Technical bulletin F-9947-D, Molecular sieve products, Linde Company Division of Union Carbide Corporation, Tonawanda, N.Y., Jan. 15, 1963) and 250 gms dry monochlorobenzene.

Phosgene is added at a rate of 0.83 gms/minute over a 30 minute period of time while maintaining the reactor vessel at a temperature of about -2° to 2° C. While maintaining this temperature, 21 gms dicyclohexylmethane-4,4'-diamine dissolved in 250 gms monochlorobenzene is added over a period of 15 minutes. The mixture is heated to a temperature of about 120° C. to about 140° C. for about 3 hours, and is agitated continually while an excess of phosgene gas is maintained in the reaction vessel. An indication that the reaction is complete is cessation of hydrogen chloride gas evolution whereupon the excess phosgene is purged from the reaction vessel by flushing with nitrogen gas. The molecular sieves and particles of molecular sieves are allowed to settle out of the reaction mixture, and the solution, which is the isocyanate containing portion, is decanted. The solution is clear and colorless. Vapor phase chromatography shows a yield of 16.5 gms of dicyclohexylmethane 4,4'-diisocyanate (63 percent theory). The reaction is illustrated as follows:

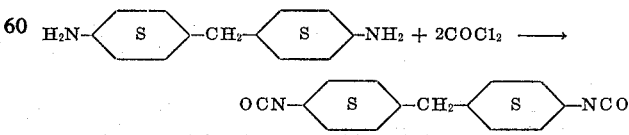

After a period of 90 days, the solution of dicyclohexylmethane 4,4'-diisocyanate still remains clear and colorless.

EXAMPLE 2

This example serves as a control and shows preparation of the isocyanate without the use of molecular sieves.

Repeating the process described in Example 1 but omitting the molecular sieves in the reaction vessel, a light yellow mixture is obtained. Upon standing in a capped container for 90 days, the color has continually darkened. Vapor phase chromatography indicates a yield of 15.3 gms dicyclohexylmethane-4,4'-diisocyanate (58.4 theory).

EXAMPLE 3

Using the procedure described in Example 1, but substituting molecular sieve types 3A, 5A, 10X, and 13X respectively (Linde, supra) for type 4A as used therein, a colorless dicyclohexylmethane-4,4'-diisocyanate is obtained in each instance.

EXAMPLE 4

To a 1 liter reaction flask is added 24.4 gms of an 80:20 mixture of 2,4-tolylene diamine and 2,6-tolylene diamine in 250 gms monochlorobenzene (solvent) and a mixture of 40 gms phosgene in 250 gms of monochlorobenzene with 100 gms type 4A molecular sieves (Linde, supra). During addition of the phosgene mixture the reaction mixture is maintained at a temperature of about 0° C. by external cooling means. The resulting slurry is heated to 133° C. and an atmosphere of phosgene gas is maintained in the reaction flask. In about 20 minutes, the solution becomes clear. After an additional 30 minutes, the reaction flask is purged with nitrogen gas and cooled to 50° C. The clear solution is an isomer mixture of tolylene-2,4-diisocyanate, and tolylene-2,6-diisocyanate which is colored with a slight yellow tint.

A second preparation of tolylene diisocyanate is made using the identical procedure outlined above, but without inclusion of molecular sieves. This second preparation of tolylene diisocyanate is a clear solution but of a much darker yellow color.

I claim:

1. In the method for producing an organic isocyanate selected from the group consisting of alkyl isocyanate of one to 12 carbon atoms, inclusive; aryl isocyanate of six to seven carbon atoms, inclusive; alkylene diisocyanate of four to 12 carbon atoms, inclusive; arylene diisocyanate of six to 12 carbon atoms, inclusive; chlorophenyl isocyanate; chlorophenylene diisocyanate; chlorohexyl isocyanate; cyclohexyl isocyanate; cyclohexane diisocyanate; methylcyclohexane diisocyanate; diphenylmethane-4,4'-diisocyanate and mixtures thereof containing polyisocyanates of higher functionality; 3-methyldiphenylmethane-4,4'-diisocyanate; bis (isocyanatomethyl) cyclohexane; diisocyanatodicyclohexylmethane; [beta-isocyanotoethylphenyl] beta-isocyanatoethylphenyl isocyanate and alpha-isocyanatobenzyl isocyanate; by the reaction of phosgene with a member selected from the group consisting of the corresponding amine and hydrobromide and hydrochloride salts thereof, the improvement comprising carrying out the reaction in the presence of a crystalline zeolitic molecular sieve selected from those having a pore opening ranging in size from that opening which will admit only those molecules having a diameter smaller than about 3 angstroms to that opening which will admit molecules having a diameter of not more than 9 angstroms; said molecular sieves being present in an amount corresponding to at least 1 part by weight per 100 parts by weight of reaction mixture.

2. The method of claim 1, wherein the molecular sieve has a pore opening which will admit only those molecules having a diameter smaller than about 4 angstroms.

3. The method of claim 1 wherein the organic isocyanate is dicyclohexylmethane-4,4'-diisocyanate.

4. The method of claim 1 wherein the ratio of molecular sieve to reaction mixture is such that there is an excess of molecular sieves by weight.

* * * * *